United States Patent

Xi

(10) Patent No.: US 6,713,906 B2
(45) Date of Patent: Mar. 30, 2004

(54) PRE-DRIVE CIRCUIT FOR BRUSHLESS DC SINGLE-PHASE MOTOR

(75) Inventor: Junnan Xi, Miyota-machi (JP)

(73) Assignee: Minebea Co., LTD, Kitasaku-gun (JP)

( * ) Notice: Subject to any disclaimer, the term of this patent is extended or adjusted under 35 U.S.C. 154(b) by 0 days.

(21) Appl. No.: 10/353,922

(22) Filed: Jan. 30, 2003

(65) Prior Publication Data

US 2003/0174456 A1 Sep. 18, 2003

(30) Foreign Application Priority Data

Feb. 1, 2002 (JP) ....................................... 2002-025577

(51) Int. Cl.[7] ................................................. H02K 7/00
(52) U.S. Cl. ..................... 310/66; 310/68 B; 310/68 R; 318/254
(58) Field of Search ............................... 310/66, 68 B, 310/67 R, 68 R; 318/254, 268, 434, 138, 798, 799, 805, 806

(56) References Cited

U.S. PATENT DOCUMENTS

| 5,489,831 A | * | 2/1996 | Harris ......................... 318/701 |
| 5,537,015 A | * | 7/1996 | Karwath ....................... 318/439 |
| 5,767,639 A | * | 6/1998 | Sakaguchi et al. ............. 318/254 |
| 5,777,449 A | * | 7/1998 | Schlager ...................... 318/459 |
| 5,789,883 A | * | 8/1998 | Gilman ........................ 318/254 |
| 5,821,709 A | * | 10/1998 | Omori et al. ................. 318/254 |
| 6,469,461 B1 | * | 10/2002 | Konda et al. ................. 318/254 |
| 6,515,447 B2 | * | 2/2003 | Horng et al. ................. 318/807 |
| 6,563,286 B2 | * | 5/2003 | Seki et al. ................... 318/727 |
| 6,603,280 B2 | * | 8/2003 | Notohara et al. ............. 318/500 |
| 2001/0019660 A1 | * | 9/2001 | Ohno et al. .................. 388/800 |

* cited by examiner

Primary Examiner—Thanh Lam
(74) Attorney, Agent, or Firm—Oliff & Berridge, PLC

(57) ABSTRACT

A pre-drive circuit for a brushless DC single-phase motor controls a motor rotational speed by driving a drive circuit for the motor. The drive circuit includes four switching elements, namely, two power-supply-side switching elements and two ground-side switching elements connected in an H configuration bridge across a motor coil of the motor. A control voltage above a power supply voltage is required to turn on the two power-supply-side switching elements. The pre-drive circuit to produce a signal for controlling the switching elements is formed of an inexpensive logic circuit. Signals for controlling the two power-supply-side switching elements are amplified to a voltage level above a power supply voltage by 4 V by operational amplifiers. Drive signal input circuits for feeding signals for controlling the two ground-side switching elements to control input terminals of the two ground-side switching elements are formed of mere respective resistors.

3 Claims, 3 Drawing Sheets

PRE-DRIVE CIRCUIT FOR BRUSHLESS DC SINGLE-PHASE MOTOR

BACKGROUND OF THE INVENTION

1. Field of the Invention

The present invention relates to a pre-drive circuit for a brushless DC single-phase motor appropriately for use as a fan motor to outwardly discharge heat generated within the casing of electronic equipment and, more particularly, to a pre-drive circuit for supplying a control signal to a switching element in a drive circuit of the motor.

2. Description of the Related Art

In office automation apparatuses such as personal computers and photocopying apparatuses, a number of electronic components is mounted in a limited space available within the casing thereof, and heat generated from the electronic components builds up in the casing, possibly damaging the electronic components.

Ventilation holes are opened in the side wall and top wall of the casing of the electronic equipment, and a fan motor is installed in the ventilation hole to discharge heat from within the casing.

Brushless DC single-phase motors are typically employed as a fan motor. A conventional pre-drive circuit for such a brushless DC single-phase motor is discussed below with reference to FIG. 3.

Referring to FIG. 3, a pre-drive circuit is a circuit portion other than a coil (motor coil) L1 for a brushless DC single-phase motor and a drive circuit 31 thereof. There are shown a DC power supply +B for motor driving, and a DC power supply +Vcc for driving the circuit.

As shown, the drive circuit 31 includes four switching elements N-channel MOS type power FETs (Field-Effect Transistors) PF1-PF4, a diode D31, and a capacitor C31.

The coil L1 is mounted on a motor stator (not shown), and is driven by a current from four power FETs PF1 through PF4 in the drive circuit 31 in a predetermined ON/OFF timing. The coil L1 thus generates a dynamic magnetic field (a rotating magnetic field).

The rotor (not shown) of the motor is provided with a permanent magnet, and is rotated as the permanent magnet rotates in step with the rotation of the rotating magnetic field.

The pre-drive circuit includes dedicated integrated circuits IC1 and IC2, resistors R31 through R35, capacitors C32 through C35, and diodes D32 through D35. Each of the power FETs PF1-PF4 contains a parasitic diode, as shown.

In the discussion that follows, the dedicated integrated circuits IC1 and IC2 are simply referred to as dedicated IC1 and IC2, respectively, and power FETs PF1 through PF4 are simply referred to as PF1 through PF4, respectively.

The dedicated IC1 receives a rotary position signal x of the motor (of the rotor, namely, the permanent magnet) detected by an unshown Hall effect device, a high-intensity signal y for shutdown, and a duty factor setting signal z for controlling the motor rotational speed. The dedicated IC1 receives a stepped up voltage VB1 discussed later, and turns on and off PF1 and PF3 in the timing determined by the signals x, y, and z.

The dedicated IC2 also receives signals x, y, and z. The dedicated IC2 receives a stepped up voltage VB2 discussed later, and turns on and off PF2 and PF4 in the timing determined by the signals x, y, and z.

Since PF3 and PF4, from among PF1 through PF4, are grounded at the sources thereof, PF3 and PF4 are turned on as long as the gates thereof (control input terminals) are slightly higher in voltage than the ground. PF1 and PF2 are arranged on the side of the power supply +B with respect to the coil L1. In the normal operating conditions under which a drive voltage of the coil L1 is approximately equal to a power supply voltage (VB), the gates of PF1 and PF2 need to be supplied with a voltage equal to or higher than-the power supply voltage (namely, a sum of the power supply voltage and a gate-source voltage to turn on PF1 and PF2).

To receive a voltage other than the power supply voltage, a power supply circuit becomes complicated in design and large in size, and costly. For this reason, any voltage is preferably prepared within the power supply circuit itself.

A voltage stepup circuit such as a charge pump circuit is thus added. A circuit of the diode 32, the capacitor 34, and the resistor R31, and a circuit of the diode D33, the capacitor C35, and the resistor R31 respectively form such a charge pump circuit.

The stepped up voltage VB1 from the node of the diode 32 and the capacitor C34 is fed to the dedicated IC1 as a stepped up voltage VB for turning on PF1. The stepped up voltage VB2 from the node of the diode D33 and the capacitor C35 is fed to the dedicated IC2 as a stepped up voltage VB for turning on PF2.

The dedicated IC1 feeds, at the gate of PF1, a high-voltage pulse signal HO responsive to the voltage VB at a predetermined ON/OFF timing, and the dedicated IC2 feeds, at the gate of PF2, a high-voltage pulse signal HO responsive to the voltage VB at a predetermined ON/OFF timing. The gates of PF3 and PF4 receive low-voltage pulse signals LO responsive to the power supply voltage (Vcc) from the dedicated IC1 and IC2 at predetermined ON/OFF timings.

The ON/OFF timings are set within the dedicated IC1 and IC2 in response to the signals x, y, and z. Signals from the dedicated IC1 and IC2 respectively turn on and off PF1 through PF4 at a predetermined duty factor at the predetermined timing, thereby feeding a current to the coil L.

The motor (the rotor) is thus rotated in a predetermined direction in accordance with the signals x, y, and z. The motor has a fan, and is mounted at a ventilation hole of a casing of electronic equipment. The motor is then rotated as a fan motor to outwardly discharge heat from within the casing of the electronic equipment.

Such a conventional circuit is costly because of its dedicated IC1 and IC2.

IC1 and IC2 are both bulky. With the bulky IC1 and IC2 and other individual electronic components, the circuit requires a large mounting space. When the circuit is applied to a small motor, it is difficult to mount the large two IC1 and IC2 and other electronic components on an associated small circuit board.

SUMMARY OF THE INVENTION

The present invention has been developed in view of this problem, and it is an object of the present invention to provide a pre-drive circuit for a brushless DC single-phase motor, which is low-cost, requires no large mounting space, and is easy to mount on a small printed wiring board.

To achieve the above object, a pre-drive circuit of the present invention for a brushless DC single-phase motor controls a motor rotational speed by changing a duty factor of an ON/OFF control voltage to switching elements. The pre-drive circuit drives a brushless DC single-phase motor drive circuit including a pair of series connections of switching elements being connected between a power supply and ground, each series connection formed of two switching elements, and a motor coil connected between the two nodes, each node of the two switching elements in each series connection, wherein the motor coil is controlled with a current fed therethrough at any timing in any direction in an ON/OFF manner by turning on and off the switching elements, and a control voltage exceeding the voltage of the power supply is needed to turn on two power-supply-side switching elements. The pre-drive circuit includes a voltage stepup circuit for stepping up the power supply voltage to a predetermined voltage, a logic circuit for generating and then outputting pulse signals for controlling the switching elements, based on a motor rotary position signal and a duty factor setting signal for controlling the motor rotational speed, a pair of operational amplifiers which are respectively connected to output terminals of the logic circuit for the pulse signals for controlling the two power supply side switching elements, are supplied with the stepped up voltage from the voltage stepup circuit as a power source, amplify the pulse signal for controlling the two power-supply-side switching elements to a predetermined voltage level above the power supply voltage, and respectively feed the amplified pulse signals to control input terminals of the two power-supply-side switching elements, and a pair of ground-side switching element driving signal input circuits which are respectively connected to pulse signal output terminals on the logic circuit for two ground-side switching elements, and feed, to control input terminals of the two ground-side switching elements, the pulse signals from the pulse signal output terminals directly or via resistors.

Preferably, the voltage stepup circuit includes a charge pump circuit, and the pre-drive circuit includes a resistor and a capacitor for removing noise connected between the output terminal of the charge pump circuit and ground.

Preferably, the pre-drive circuit includes a voltage limiting element connected between the output terminal of the charge pump circuit and ground.

DESCRIPTION OF THE PREFERRED EMBODIMENTS

The embodiments of the present invention are discussed below with reference to the drawings.

Figure 1:
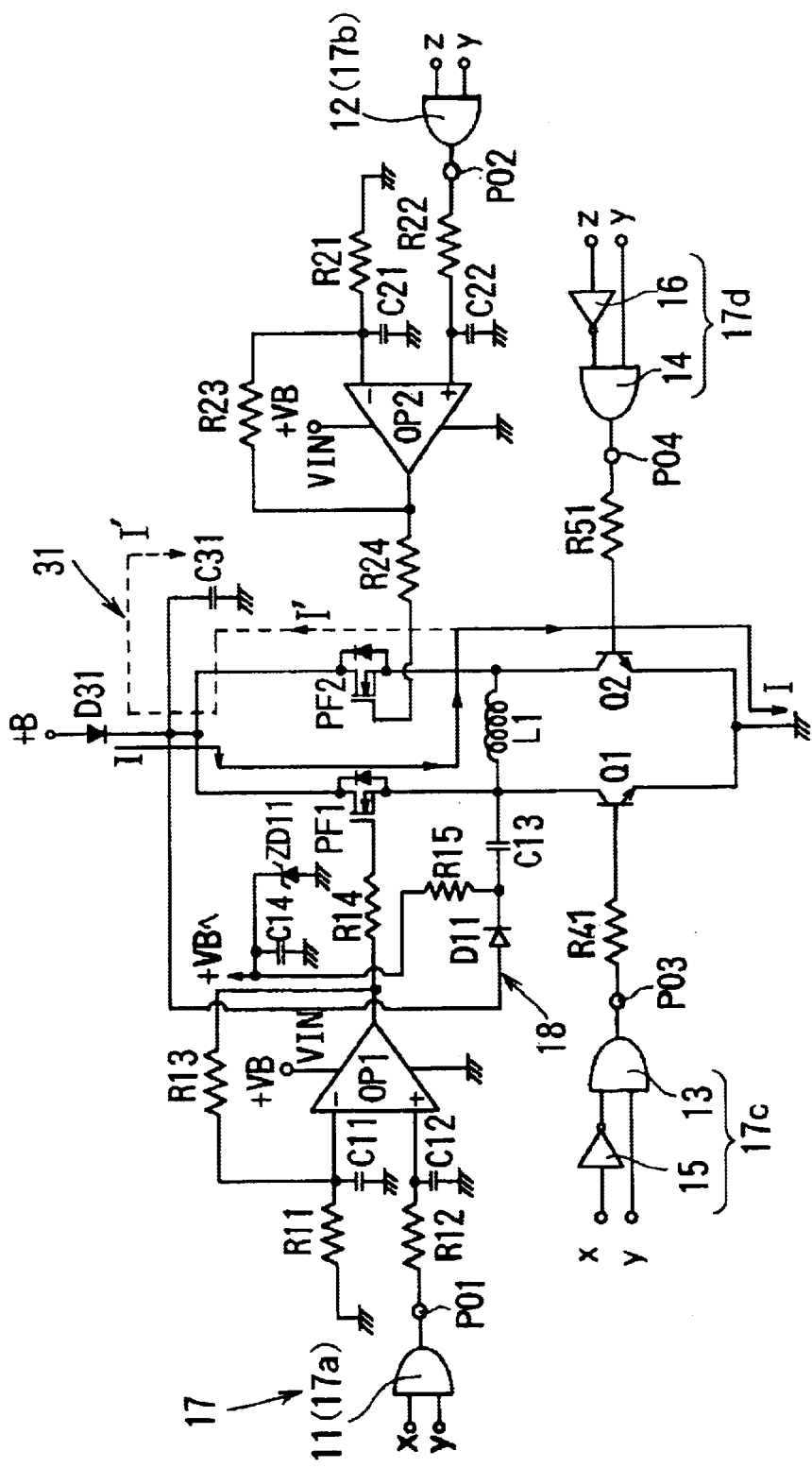
FIG. 1 is a circuit diagram illustrating one embodiment of the present invention.

FIG. 1 is a circuit diagram of one embodiment of a pre-drive circuit for a brushless DC single-phase motor of this invention.

Referring to FIG. 1, a circuit portion other than a coil L1 (motor coil) of a brushless DC single-phase motor and a drive circuit 31 is a pre-drive circuit. Designated +B is a DC power supply for driving the motor coil.

As shown, the drive circuit 31 includes four switching elements, namely, N-channel MOS type power FETs (Field-Effect Transistors) PF1, and PF2, and NPN type transistors Q1 and Q2, a diode D31, and a capacitor C31.

The power FETs PF1 and PF2 and the transistors Q1 and Q2 are serial connections of switching elements (a serial connection of PF1 and Q1 and a serial connection of PF2 and Q2), and are connected with shown polarities between the power supply +B and ground. The diode D31 is connected between the power supply +B and the node of the two serial connections of PF1 and Q1 and PF2 and Q2 with the forward direction aligned with the power supply +B. The capacitor C31 is connected between the cathode of the diode D31 and ground. The coil L1 to be driven is connected between the node of the power FET PF1 and the transistor Q1 and the node of the power FET PF2 and the transistor Q2.

The coil L1 is mounted on the stator (not shown) of the motor, and the power FETs PF1 and PF2 and the transistor Q1 and Q2 drive the coil L1 by allowing a current to flow therethrough at a predetermined ON/OFF timing, thereby generating dynamic magnetic field (rotating magnetic field).

The rotor (not shown) of the motor includes a permanent magnet, and is rotated when the permanent magnet rotates in step with the magnetic field.

The pre-drive circuit of this embodiment includes logic circuits 17 (17a–17d) including four AND gates 11–14 and two inverters 15 and 16, two operational amplifiers OP1 and OP2, resistors R11–R15, R21–R24, R41, and R51, and capacitors C1–C14, C21, and C22. Each of the power FETs PF1 and PF2 contains a parasitic diode.

In the discussion that follows, the power FETs are simply referred to as PF1 and PF2, the transistors Q1 and Q2 are simply referred to as Q1 and Q2, and the operational amplifiers OP1 and OP2 are simply referred to as OP1 and OP2.

Figure 3:
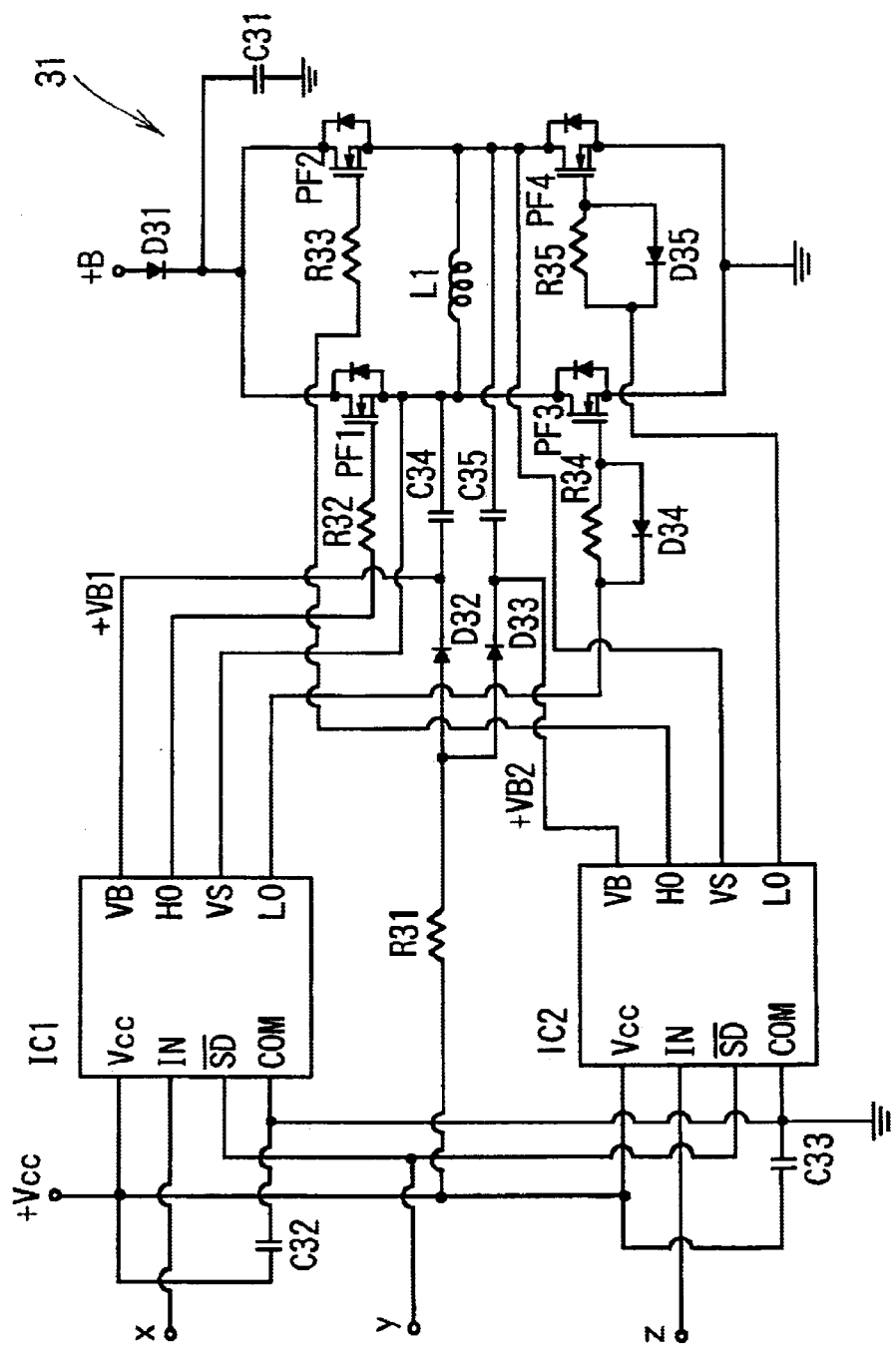
FIG. 3 is a circuit diagram of a conventional art.

In response to the signals x, y, and z similar to those shown in FIG. 3, the logic circuits 17 output signals (in voltage waveform) similar to those output from the dedicated IC1 and IC2 shown in FIG. 3, and turn on and off PF1, PF2, Q1, and Q2 at the timing determined by the signals x, y, and z. The logic circuits 17 are formed of a general-purpose IC including four or more AND gates, and two or more inverters.

Q1 and Q2, out of transistors PF1, PF2, Q1 and Q2, are grounded at the emitters thereof and are turned on if the bases (control input terminals) thereof are slightly higher than the ground voltage. PF1 and PF2 are arranged on the power supply +B side with respect to the coil L1. In the normal operating conditions under which a drive voltage of the coil L1 is approximately identical to a power supply voltage B, the gates of PF1 and PF2 need to be supplied with a voltage equal to or higher than the power supply voltage (namely, the sum of the power supply voltage and a gate-source voltage to turn on PF1 and PF2). To receive a voltage other than the power supply voltage from outside, a power supply circuit becomes complicated in design and large in size, and costly. For this reason, any voltage is preferably prepared within the power supply circuit itself.

To this end, a voltage stepup circuit such as a charge pump circuit is typically added. As shown, a charge pump circuit 18 is employed.

The charge pump circuit 18 includes a series connection of a diode D11 and a capacitor C13 between the cathode of the diode D31 with the anode thereof connected to the power supply +B and the source of PF1 in the forwarding direction aligned with the diode D31, and a resistor R15 with the other end thereof connected to the node of the diode D11 and the capacitor C13.

The charge pump circuit 18 outputs, at one end of the resistor R15 (the output terminal of the charge pump circuit), a stepped up voltage VB determined by the voltage value B of the power supply +B and the resistance of the resistor R15.

Connected between the one end of the resistor R15 and ground is a capacitor C14 which has a noise removing function and stabilizes the power supply +B in cooperation with the resistor R15. Also connected in parallel therewith is a zener diode ZD11 having a voltage limiting function.

OP1 and OP2 form a power-supply-side switching element drive circuit which amplify pulse signals for controlling two power-supply-side switching elements, namely, PF1 and PF2 to a predetermined voltage level above the power supply voltage B (at least to a level high enough to turn on PF1 and PF2).

Specifically, OP1 is configured with the inverting input − thereof grounded through a resistor R11, and with the non-inverting input + thereof connected to a pulse signal output terminal PO1 of the logic circuit 17a through a resistor R12, and with the output thereof connected to the inverting input − thereof through a resistor R13 and connected to the gate (the control input terminal) of the power-supply-side PF1 through a resistor R14.

A power supply input terminal VIN of OP1 is connected to the one end of the resistor R15 (the output terminal of the charge pump circuit) of the charge pump circuit 18. OP1 receives a predetermined stepped up voltage VB above the supply voltage of the power supply +B as the operating power supply voltage.

By setting the resistors R11 through R14 to appropriate resistance values, the level of an output voltage V1 of OP1, namely, a control voltage level of PF1, is amplified to a level high enough to turn PF1.

Specifically, let VP1 represent an input voltage to the non-inverting input + of OP1, R11 represent the resistance value of the resistor R11, and R13 represent the resistance value of the resistor R13, and the output voltage V1 of OP1 is expressed as follows:

$$V1=\{1+(R13/R11)\}VP1$$

The resistance values of the resistors R11 and R13 are determined so that the output voltage V1is high enough to turn on PF1. By setting the resistors R12 and R14 to appropriate resistance values, OP1 thus controls PF1 for on and off operations.

The zener diode ZD11 prevents a surge voltage from being input to the power supply input terminal VIN of OP1, thereby protecting OP1 from being damaged by the surge voltage.

Capacitors C11 and C12 respectively between input terminals − and + of OP1 and ground are used to remove noise.

OP2 is configured with the inverting input − thereof grounded through the resistor 21, with the non-inverting input + thereof connected to a pulse signal output terminal PO2 of the logic circuit 17b through the resistor R22, and with the output thereof connected to the inverting input − thereof through the resistor R23 and connected to the gate (the control input terminal) of the power-supply-side PF2 through the resistor R24.

The power supply input terminal VIN of OP2 is connected to the one end of the resistor R15 (the output terminal of the charge pump circuit) of the charge pump circuit 18, which is also commonly shared by OP1. OP2 thus receives the predetermined stepped up voltage VB above the voltage value of the power supply +B.

By setting the resistors R21–R24 to appropriate resistance values, the level of an output voltage V2 of OP2, namely, a control voltage level of PF2, is amplified to a level high enough to turn PF2.

Specifically, let VP2 represent an input voltage to the non-inverting input + of OP2, R21 represent the resistance value of the resistor R21, and R23 represent the resistance value of the resistor R23, and the output voltage V2 of OP2 is expressed as follows:

$$V2=\{1+(R23/R21)\}VP2$$

The resistance values of the resistors R21 and R23 are determined so that the output voltage V2 is high enough to turn on PF2. By setting the resistors R22 and R24 to appropriate resistance values, OP2 thus controls PF2 for on and off operations.

The zener diode ZD11, which is also commonly shared by OP1 as the charge pump circuit 18 is, prevents a surge voltage from being input to the power supply input terminal VIN of OP2, thereby protecting OP2 from being damaged by a surge voltage.

Capacitors C21 and C22 respectively between input terminals − and + of OP2 and ground are used to remove noise.

The resistors R41 and R51 respectively form ground-side switching element drive circuits for supplying pulse signals to the bases of the ground-side switching elements Q1 and Q2 for controlling them. The drive circuits sets the pulse signals to an appropriate voltage level equal to or lower than the power supply voltage B still high enough to turn on the ground-side switching elements Q1 and Q2, respectively.

Specifically, the resistor R41 is configured with one end thereof connected to a pulse signal output terminal PO3 of the logic circuit 17c and with the other end thereof connected to the base of Q1. The resistor R41 controls Q1 for on and off operations in response to the pulse signal from the pulse signal output terminal PO3.

The resistor R51 is configured with one end thereof connected to a pulse signal output terminal PO4 of the logic circuit 17d and with the other end thereof connected to the base of Q2. The resistor R51 controls Q2 for on and off operations in response to the pulse signal from the pulse signal output terminal PO4.

The operation of the above-referenced circuit of the present information is discussed below.

In response to the signals x, y, and z similar to those described with reference to FIG. 3, the logic circuits 17 (17a–17d) output signals (in voltage waveform) similar to those output from the dedicated IC1 and IC2 shown in FIG. 3 to the pulse signal output terminals PO1–PO4.

Specifically, a signal, similar to the pulse signal HO from the dedicated IC1, is input to the pulse signal output terminal PO1, and a signal, similar to the pulse signal LO, is input to the pulse signal output terminal PO3. A signal, similar to the pulse signal HO from the dedicated IC2, is input to the pulse signal output terminal PO2, and a signal, similar to the pulse signal LO, is input to the pulse signal output terminal PO4.

OP1 and OP2 are respectively supplied with the stepped up voltage VB from the charge pump circuit 18 as a power supply voltage. The pulse signals output to the pulse signal output terminal PO1 and PO2 are amplified to voltage levels (high-voltage level) high enough to turn PF1 and PF2 respectively, by OP1 and OP2 and then supplied to the gates of PF1 and PF2.

The pulse signals output to the pulse signal output terminals PO3 and PO4 are supplied to the bases of Q1 and Q2 respectively through the resistors R41 and R51 at (low voltage) levels enough to turn on Q1 and Q2.

When a current flows through the coil L1 from the left hand side to the right hand side as shown in the normal state (to blow air when the motor is applied as the fan motor), signals of a duty factor of 100%, in other words, signals to rotate the motor at the fastest speed are output to the pulse signal output terminals PO1–PO4 from the logic circuits 17

(17a–17d). In this case, high voltage level signals are output to the pulse signal output terminals PO1 and PO4, and low voltage level signals are output to the pulse signal output terminals PO2 and PO3.

The high voltage level signal to the pulse signal output terminal PO1 is input to OP1, and is then amplified to a high voltage level equal to or higher than the power supply voltage B, and is then fed to the gate of PF1 to turn on PF1.

The high voltage level pulse signal, fed to the pulse signal output terminal PO4, goes to the base of Q2 through the resistor R51. The high voltage level pulse signal, equal to or lower than the power supply voltage B and still high enough to turn on Q2, is fed to the base of Q2, thereby turning on Q2.

Since the low voltage level signals are respectively fed to the pulse signal output terminals PO2 and PO3, OP2 fails to feed a voltage high enough to turn on PF2, and the resistor R51 fails to feed a voltage high enough to turn on Q1. Both PF2 and Q1 remain off.

The current I from the DC power supply +B flows through the path of the diode D31→PF1 (drain-source)→the coil L1→Q2 (collector-emitter)→ground (see a solid line arrow I) every high level period of the pulse signals to the pulse signal output terminals PO1 and PO4. The rising edge and the falling edge of PF1 coincide with those of Q2 and the motor (the rotor) rotates the fastest if the duty factor is 100%. When the motor is applied as a fan motor, the fan motor blows the maximum possible air, and discharges heat outwardly with the maximum rate from within the casing of electronic equipment to which the fan motor is installed.

The timings of the rising edge and the falling edge of the pulse signals to the pulse signal output terminals PO1–PO4 are determined by the rotary position signal x of the motor (or the rotor, namely, the permanent magnet) detected by the unshown Hall effect device.

When the fan motor is rotated at a duty factor less than 100%, for example, at a duty factor of 50%, the falling edge of the pulse signal to the pulse signal output terminal PO4 is earlier by half than that at a duty factor of 50%. Specifically, the high-level period of the pulse signal to the pulse signal output terminal PO4 is halved without changing the high-level period of the pulse signal to the pulse signal output terminal PO1.

The duration during which the current from the DC power supply +B flows through the path of the diode D31→PF1 (drain-source)→the coil L1→Q2 (collector-emitter) →ground becomes half the duration at a duty factor of 100%, and the motor rotates at half the maximum speed.

For the ON period of PF1 other than the ON period of Q2, namely, for the duration during which PF1 only is turned on with Q2 turned off, a current I' from the coil L1 flows through the parasitic diode of PF2 and absorbed by the capacitor C31 (see a broken line arrow I'). Charge absorbed by the capacitor C31 is released during the ON period of PF2.

The diode D31 prevents a current from flowing from the coil L1 back to the DC power supply +B (in reverse current prevention). The capacitor C31 has a function of noise removing.

When the high voltage level pulse signals are fed to the pulse signal output terminals PO2 and PO3 and when the low voltage level pulse signals are fed to the pulse signal output terminals PO1 and PO4, PF1 and Q2 are turned off, and PF2 and Q1 are turned on. A current flows through the coil L1 from the right hand side to the left hand side, thereby allowing the motor to rotate in a reverse direction. During the reverse rotation, PF2 and Q1 operate in the same manner as PF1 and Q2 during the normal rotation. The coil L1 allows the current to now therethrough at a predetermined duty factor in response to the pulse signals x, y, and z to the pulse signal output terminals PO2 and PO3, thereby causing the motor to rotate (in a reverse direction).

Figure 2:
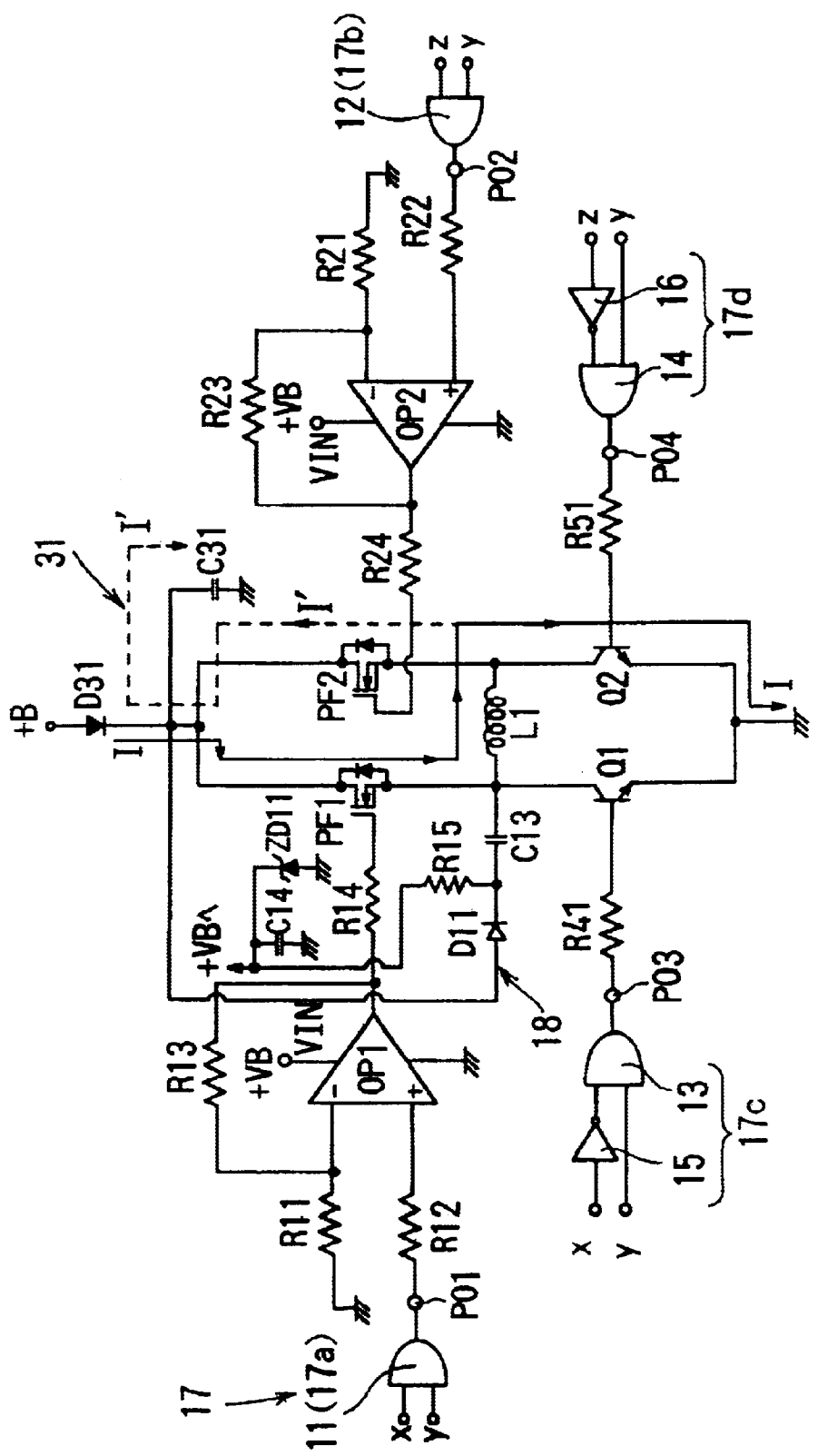
FIG. 2 is a circuit diagram illustrating another embodiment of the present invention.

FIG. 2 is a circuit diagram showing another embodiment of the present invention.

As shown, components identical to those described with reference to FIG. 1 are designated with the same reference numerals. In this embodiment, capacitors C11, C12, C21, and C22 are eliminated from the circuit shown in FIG. 1. Although the capacitors C11, C12, C21, and C22 are used to remove noise, they are dispensed with when circuit simplicity has priority.

In this embodiment, N-channel MOS type power FETs are used for the power-supply-side switching elements. The present invention is not limited to the N-channel MOS type power FETs. For example, a power-transistor with diodes in back to back connection between the collector, and emitter thereof may be used. The ground side two switching elements are not limited to NPN type transistors.

Although a charge pump circuit is used as a voltage stepup circuit to supply the operational amplifier for driving the power-supply-side switching elements with a voltage equal to or higher than the power supply voltage. Alternatively, a bootstrap circuit may be used.

The two operational amplifiers for driving the power-supply-side switching elements may be an IC into which two operational amplifiers are packaged, for example, a dual ground sense operational amplifier BA10358F (manufactured by ROHM Co., Ltd) may be used. In this device, two operational amplifiers are encapsulated into a common package, and commonly share an operational power supply voltage input terminal and a ground terminal. The mounting space is further reduced.

In the above embodiments, the ground-side switching element drive circuit is formed of a resistor. When the output signal of logic circuit is used as is, the ground-side switching element driver circuit is formed of a circuit (a mere connection line) for connecting the logic circuit to the ground-side switching element.

As described above in the above embodiments, the logic circuit (the AND gates, inverters, etc.) replaces the conventional dedicated IC. The operational amplifier forms a circuit which amplifies the pulse signal for controlling the power-supply-side switching element before feeding the pulse signal to the control input terminal of the power-supply-side switching element. A resistor or a mere connection line is a circuit which supplies the control input terminal of the ground-side switching element with the pulse signal for controlling the ground-side switching element.

This arrangement reduces the cost and the mounting space of the pre-drive circuit, thereby helping the pre-drive circuit to be easily mounted on a small wiring board.

The voltage stepup circuit for providing the operational amplifier with the power supply voltage is formed of the charge pump circuit, and the noise removing capacitor is connected between the output terminal of the charge pump circuit and ground. A simple and reliable power supply for the operational amplifier thus results.

Since the voltage limiting element is connected between the output terminal of the charge pump circuit and ground, the operational amplifier is protected from damage caused by a surge voltage.

What is claimed is:

1. A pre-drive circuit for a brushless DC single-phase motor for controlling a motor rotational speed by changing a duty factor of an ON/OFF control voltage to switching elements, the pre-drive circuit driving a brushless DC single-phase motor drive circuit comprising a pair of series connections of switching elements being connected between a power supply and ground, each series connection formed of two switching elements, and a motor coil connected between the two nodes, each node of the two switching elements in each series connection, wherein the motor coil is controlled with a current fed therethrough at any timing in any direction in an ON/OFF manner by turning on and off the switching elements, and a control voltage exceeding the voltage of the power supply is needed to turn on two power-supply-side switching elements, the pre-drive circuit comprising:

a voltage stepup circuit for stepping up the power supply voltage to a predetermined voltage;

a logic circuit for generating and then outputting pulse signals for controlling the switching elements, based on a motor rotary position signal and a duty factor setting signal for controlling the motor rotational speed, a pair of operational amplifiers which are respectively connected to output terminals of the logic circuit for the pulse signals for controlling the two power-supply-side switching elements, are supplied with the stepped up voltage from the voltage stepup circuit a power source, amplify the pulse signal for controlling the two power-supply-side switching elements to a predetermined voltage level above the power supply voltage, and respectively feed the amplified pulse signals to control input terminals of the two power-supply-side switching elements, and a pair of ground-side switching element driving signal input circuits which are respectively connected to pulse signal output terminals on the logic circuit for two ground-side switching elements, and feed, to control input terminals of the two ground-side switching elements, the pulse signals from the pulse signal output terminals directly or via resistors.

2. A pre-drive circuit for a brushless DC single-phase motor according to claim 1, wherein the voltage stepup circuit comprises a charge pump circuit, and wherein the pre-drive circuit comprises a resistor and a capacitor for removing noise connected between the output terminal of the charge pump circuit and ground.

3. A pre-drive circuit for a brushless DC single-phase motor according to claim 2, comprising a voltage limiting element connected between the output terminal of the charge pump circuit and ground.

* * * * *